(12) United States Patent
Liu (10) Patent No.: US 12,052,624 B2
(45) Date of Patent: Jul. 30, 2024

(54) NETWORK OPTIMIZATION METHOD BASED ON WEARABLE DEVICE AND WEARABLE DEVICE

(71) Applicant: GUANGDONG GENIUS TECHNOLOGY CO., LTD., Dongguan (CN)

(72) Inventor: Pengfei Liu, Dongguan (CN)

(73) Assignee: GUANGDONG GENIUS TECHNOLOGY CO., LTD., Dongguan (CN)

(*) Notice: Subject to any disclaimer, the term of this patent is extended or adjusted under 35 U.S.C. 154(b) by 400 days.

(21) Appl. No.: 17/470,983

(22) Filed: Sep. 9, 2021

(65) Prior Publication Data
US 2021/0410036 A1 Dec. 30, 2021

Related U.S. Application Data

(63) Continuation of application No. PCT/CN2019/095274, filed on Jul. 9, 2019.

(30) Foreign Application Priority Data

Mar. 14, 2019 (CN) .......................... 201910191528.4

(51) Int. Cl.
*H04W 36/16* (2009.01)
*H04W 4/02* (2018.01)
(Continued)

(52) U.S. Cl.
CPC ......... *H04W 36/165* (2013.01); *H04W 4/025* (2013.01); *H04W 24/02* (2013.01);
(Continued)

(58) Field of Classification Search
CPC ......... H04W 36/165; H04W 36/00837; H04W 36/0085; H04W 4/025; H04W 24/02;
(Continued)

(56) References Cited

U.S. PATENT DOCUMENTS

2013/0045749 A1* 2/2013 Sridhar ............. H04W 36/0085
   455/443
2013/0210415 A1* 8/2013 Mathias ................ H04W 48/18
   455/418

(Continued)

FOREIGN PATENT DOCUMENTS

CA        2943412 A1    9/2015
CN     104394564 A      3/2015

(Continued)

OTHER PUBLICATIONS

Invitation to Respond to Written Opinion issued in counterpart Singapore Patent Application 11202109954W, dated Jun. 2, 2023.

(Continued)

*Primary Examiner* — Joseph A Bednash
(74) *Attorney, Agent, or Firm* — Westbridge IP LLC (57) ABSTRACT

A network optimization method based on a wearable device and a wearable device are disclosed, where the method includes: detecting whether the wearable device is in a ping-pong handover network environment; if yes, monitoring a state of the wearable device, and obtaining state information of the wearable device; where the state information includes call state information, data network state information, screen state information, and positioning information; adjusting a network standard according to the state information; the network standard is a type of the data network; recording adjustment information of the network standard; the adjustment information includes adjustment time and adjustment effect indication information; adjusting an adjustment parameter group related to the network standard of the wearable device dynamically according to the adjustment information and obtaining a target adjustment parameter group, so as to adjust the network standard according to the target adjustment parameter group.

9 Claims, 4 Drawing Sheets

(51) Int. Cl.
    *H04W 24/02* (2009.01)
    *H04W 24/10* (2009.01)
    *H04W 36/00* (2009.01)
    *H04W 36/32* (2009.01)
    *H04W 52/02* (2009.01)

(52) U.S. Cl.
    CPC ..... *H04W 24/10* (2013.01); *H04W 36/00837* (2018.08); *H04W 36/0085* (2018.08); *H04W 36/32* (2013.01); *H04W 52/0251* (2013.01)

(58) Field of Classification Search
    CPC .. H04W 24/10; H04W 36/32; H04W 52/0251
    See application file for complete search history.

(56) References Cited

U.S. PATENT DOCUMENTS

| | | | |
|---|---|---|---|
| 2014/0073289 A1 | 3/2014 | Velasco | |
| 2015/0172982 A1 | 6/2015 | Park et al. | |
| 2015/0304907 A1 | 10/2015 | Centonza et al. | |
| 2016/0345217 A1* | 11/2016 | Tabet | H04B 17/336 |
| 2018/0324658 A1 | 11/2018 | Tabet et al. | |
| 2019/0342829 A1* | 11/2019 | Klatt | H04W 52/0216 |

FOREIGN PATENT DOCUMENTS

| | | | |
|---|---|---|---|
| CN | 105142188 A * | 12/2015 | H04W 36/00 |
| CN | 105142188 A | 12/2015 | |
| CN | 105848189 A | 8/2016 | |
| CN | 105873145 A | 8/2016 | |
| CN | 105873149 A | 8/2016 | |
| CN | 105992290 A | 10/2016 | |
| CN | 108471636 A | 8/2018 | |
| CN | 108650692 A | 10/2018 | |
| CN | 108834190 A | 11/2018 | |
| CN | 109379767 A | 2/2019 | |
| EP | 2820885 B1 | 3/2016 | |
| WO | 2015139850 A1 | 9/2015 | |
| WO | 2018018513 A1 | 2/2018 | |
| WO | 2018172600 A1 | 9/2018 | |

OTHER PUBLICATIONS

Notice of Granting Invention Patent Right issued in counterpart Chinese Patent Application No. 201910191528.4, dated Sep. 24, 2021.

First Office Action issued in counterpart Chinese Patent Application No. 201910191528.4, dated Nov. 3, 2020.

International Search Report and Written Opinion issued in corresponding PCT Application No. PCT/CN2019/095274, dated Nov. 6, 2019.

Second Office Action issued in counterpart Chinese Patent Application No. 201910191528.4, dated Jun. 7, 2021.

Extended European Search Report issued in European Patent Application No. 19918556.2, dated Nov. 7, 2022.

* cited by examiner

NETWORK OPTIMIZATION METHOD BASED ON WEARABLE DEVICE AND WEARABLE DEVICE

CROSS-REFERENCE TO RELATED APPLICATIONS

This application is a continuation application of International Application No. PCT/CN2019/095274 filed on Jul. 9, 2019, which claims priority to Chinese Patent Application No. 201910191528.4, filed on Mar. 14, 2019, which are incorporated herein by reference in their entireties.

TECHNICAL FIELD

The present disclosure relates to the technical field of communications, and in particular, to a network optimization method based on a wearable device and a wearable device.

BACKGROUND

At present, wearable devices (such as smart watches and smart bracelets) are becoming more and more miniaturized. Due to small size and small battery capacity of wearable devices, the power consumption problem appears particularly prominent. If the user is in a more complex network environment, for example, when the user approaches a boundary of two cells or an overlapping coverage area of a plurality of cells, there will be a ping-pong handover effect of two or more cells, which will consume significant resources at this time. As a result, the power consumption increases sharply, thereby reducing the standby capability of the wearable device.

SUMMARY

Embodiments of the present disclosure disclose a network optimization method based on a wearable device and a wearable device, which can reduce the power consumption and increase a standby capability of the wearable device.

According to a first aspect, the embodiments of the present disclosure disclose a network optimization method based on a wearable device, including:

detecting whether the wearable device is in a ping-pong handover network environment;

if yes, monitoring a state of the wearable device, and obtaining state information of the wearable device; where the state information includes call state information, data network state information, screen state information, and positioning information;

adjusting a network standard according to the state information; the network standard is a type of the data network;

recording adjustment information of the network standard; the adjustment information includes adjustment time and adjustment effect indication information;

adjusting an adjustment parameter group related to the network standard of the wearable device dynamically according to the adjustment information and obtaining a target adjustment parameter group, so as to adjust the network standard according to the target adjustment parameter group.

As an optional implementation, in the first aspect of the embodiments of the present disclosure, the detecting whether the wearable device is in a ping-pong handover network environment includes:

obtaining an abnormal hold time index value for measuring the ping-pong handover network environment;

converting the abnormal hold time index value into a time data index value through a first preset algorithm;

when the time data index value is greater than a first preset time threshold value, monitoring a signal switching index value of a cell where the wearable device is located;

when the signal switching index value is greater than or equal to a preset signal switching index value, determining that the wearable device is in the ping-pong handover network environment; and when the signal switching index value is smaller than the preset signal switching index value, determining that the wearable device is not in the ping-pong handover network environment.

As an optional implementation, in the first aspect of the embodiments of the present disclosure, the adjusting a network standard according to the state information includes:

when the call state information indicates that the wearable device is not in a call status and the data network state information indicates that the wearable device does not have a data service, switching an original network standard to a first network standard; a duration time of the first network standard is based on a preset time attenuation gradient list, and a signal transmission rate of the original network standard is higher than a signal transmission rate of the first network standard;

when the positioning information indicates that a moving distance of the wearable device is greater than a preset distance value, switching the first network standard to the original network standard.

As an optional implementation, in the first aspect of the embodiments of the present disclosure, the method further includes:

when the wearable device is within a preset time period and the positioning information indicates that the wearable device has not moved within a second preset time value, obtaining a current signal strength;

determining whether the current signal strength is less than a preset signal strength;

if yes, turning off the data service, and when the wearable device is in a weak network environment and the screen state information indicates that the wearable device is in a screen-on state turning on the data service;

if not, switching the original network standard to a second network standard, and when the wearable device is in the weak network environment and the screen state information indicates that the wearable device is not in the screen-on state and the wearable device is not within the preset time period, switching the second network standard to the original network standard; where the signal transmission rate of the original network standard is higher than a signal transmission rate of the second network standard.

As an optional implementation, in the first aspect of the embodiments of the present disclosure, the adjusting an adjustment parameter group related to the network standard of the wearable device dynamically according to the adjustment information and obtaining a target adjustment parameter group so as to adjust the network standard according to the target adjustment parameter group, includes:

based on the adjustment information, adjusting the adjustment parameter group related to the network standard of the wearable device dynamically by using a second preset algorithm and an adjustment frequency determined according to a network environment of the wearable device and obtaining a target adjustment parameter group, so as to adjust the network standard according to the target adjustment parameter group.

According to a second aspect, the embodiments of the present disclosure disclose a wearable device, including:

a detecting unit, configured to detect whether the wearable device is in a ping-pong handover network environment;

a state monitoring unit, configured to monitor a state of the wearable device, and obtain state information of the wearable device when the detecting unit detects that the wearable device is in the ping-pong handover network environment; where the state information includes call state information, data network state information, screen state information, and positioning information;

an adjusting unit, configured to adjust a network standard according to the state information; the network standard is a type of the data network;

a recording unit, configured to record adjustment information of the network standard; the adjustment information includes adjustment time and adjustment effect indication information;

a dynamic adjustment unit, configured to dynamically adjust an adjustment parameter group related to the network standard of the wearable device according to the adjustment information and obtain a target adjustment parameter group, so as to adjust the network standard according to the target adjustment parameter group.

As an optional implementation, in the second aspect of the embodiments of the present disclosure, the detecting unit includes:

a first obtaining sub-unit, configured to obtain an abnormal hold time index value for measuring the ping-pong handover network environment;

a converting sub-unit, configured to convert the abnormal hold time index value into a time data index value through a first preset algorithm;

a monitoring sub-unit, configured to monitor a signal switching index value of a cell that the wearable device is located when the time data index value is greater than a first preset time threshold value;

a determining sub-unit, configured to determine that the wearable device is in the ping-pong handover network environment when the signal switching index value is greater than or equal to a preset signal switching index value; and determine that the wearable device is not in the ping-pong handover network environment when the signal switching index value is smaller than the preset signal switching index value.

As an optional implementation, in the second aspect of the embodiments of the present disclosure, the adjusting unit includes:

a first switching sub-unit, configured to, switch an original network standard to a first network standard when the call state information indicates that the wearable device is not in a call status and the data network state information indicates that the wearable device does not have a data service; where a duration time of the first network standard is based on a preset time attenuation gradient list, and a signal transmission rate of the original network standard is higher than a signal transmission rate of the first network standard; and switch the first network standard to the original network standard when the positioning information indicates that a moving distance of the wearable device is greater than a preset distance value.

As an optional implementation, in the second aspect of the embodiments of the present disclosure, the adjusting unit further includes:

a second obtaining sub-unit, configured to obtain a current signal strength when the wearable device is within a preset time period and the positioning information indicates that the wearable device has not moved within a second preset time value;

a determining sub-unit, configured to determine whether the current signal strength is smaller than a preset signal strength;

a data service sub-unit, configured to turn off the data service when the determining subunit determines that the current signal strength is smaller than the preset signal strength, and turn on the data service when the wearable device is in a weak network environment and the screen state information indicates that the wearable device is in a screen-on state;

a second switching unit, configured to switch the original network standard to a second network standard when the determining subunit determines that the current signal strength is greater than or equal to the preset signal strength, and switch the second network standard to the original network standard when the wearable device is in the weak network environment and the screen state information indicates that the wearable device is not in the screen-on state and the wearable device is not within the preset time period; where the signal transmission rate of the original network standard is higher than a signal transmission rate of the second network standard.

As an optional implementation, in the second aspect of the embodiments of the present disclosure, the dynamic adjustment unit is configured to dynamically adjust an adjustment parameter group related to the network standard of the wearable device according to the adjustment information and obtaining a target adjustment parameter group so as to adjust the network standard according to the target adjustment parameter group, specifically is:

the dynamic adjustment unit is configured to, based on the adjustment information, adjust the adjustment parameter group related to the network standard of the wearable device dynamically by using a second preset algorithm and an adjustment frequency determined according to a network environment of the wearable device and obtain a target adjustment parameter group, so as to adjust the network standard according to the target adjustment parameter group.

According to a third aspect, the embodiments of the present disclosure disclose a wearable device, including:

a memory having executable program codes stored therein;

a processor coupled to the memory;

the processor invokes the executable program codes stored in the memory to perform the network optimization method based on a wearable device as described in the first aspect of the embodiments of the present disclosure.

According to a fourth aspect, the embodiments of the present disclosure disclose a computer readable storage medium storing a computer program, where the computer program causes a computer to execute the network optimization method based on a wearable device as described in the first aspect of the embodiments of the present disclosure.

According to a fifth aspect, the embodiments of the present disclosure disclose a computer program product, when the computer program product runs on a computer, the computer is enabled to perform some or all of the steps of any method of the first aspect.

According to a sixth aspect, the embodiments of the present disclosure disclose an application publishing platform, and the application publishing platform is configured to publish a computer program product. When the computer program product runs on a computer, the computer performs some or all of the steps of any method of the first aspect.

Compared with the prior art, the embodiments of the present disclosure have the following beneficial effects:

In the embodiments of the present disclosure, when it is detected that the wearable device is in a ping-pong switching network environment, the network standard is adjusted according to monitored device state information, then the adjustment parameter group related to the network standard is dynamically adjusted according to the adjustment information of the network standard, and a target adjustment parameter group that is most suitable for the device may be obtained, so that when the device enters the ping-pong handover network environment, the target adjustment parameter group is used to adjust the network standard for network optimization, which may reduce power consumption and increase the standby capability of the wearable device.

BRIEF DESCRIPTION OF THE DRAWINGS

In order to illustrate the technical solutions in the embodiments of the present disclosure in a clearer manner, the drawings desired for describing the embodiments of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Hereinafter, the technical solutions in the embodiments of the present disclosure will be described clearly and thoroughly in conjunction with the drawings in the embodiments of the present disclosure. Obviously, the described embodiments are merely some of the embodiments of the present disclosure, but not all of the embodiments. Based on the embodiments in the present disclosure, all other embodiments obtained by a person of ordinary skill in the art without creative efforts should fall within the protection scope of the present disclosure.

It should be noted that, in the specification and claims of the present disclosure, the terms such as "first" and "second" are intended to distinguish between different objects but do not necessarily indicate a specific order or sequence. Moreover, in the embodiments of the present disclosure, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The embodiments of the present disclosure disclose a network optimization method based on a wearable device and a wearable device, so that when the device enters a ping-pong handover network environment, the target adjustment parameter group is used to adjust the network standard for network optimization, which may reduce power consumption and increase the standby capability of the wearable device. The following describes in detail from a perspective of the wearable device with reference to the accompanying drawings.

Embodiment I

Figure 1:
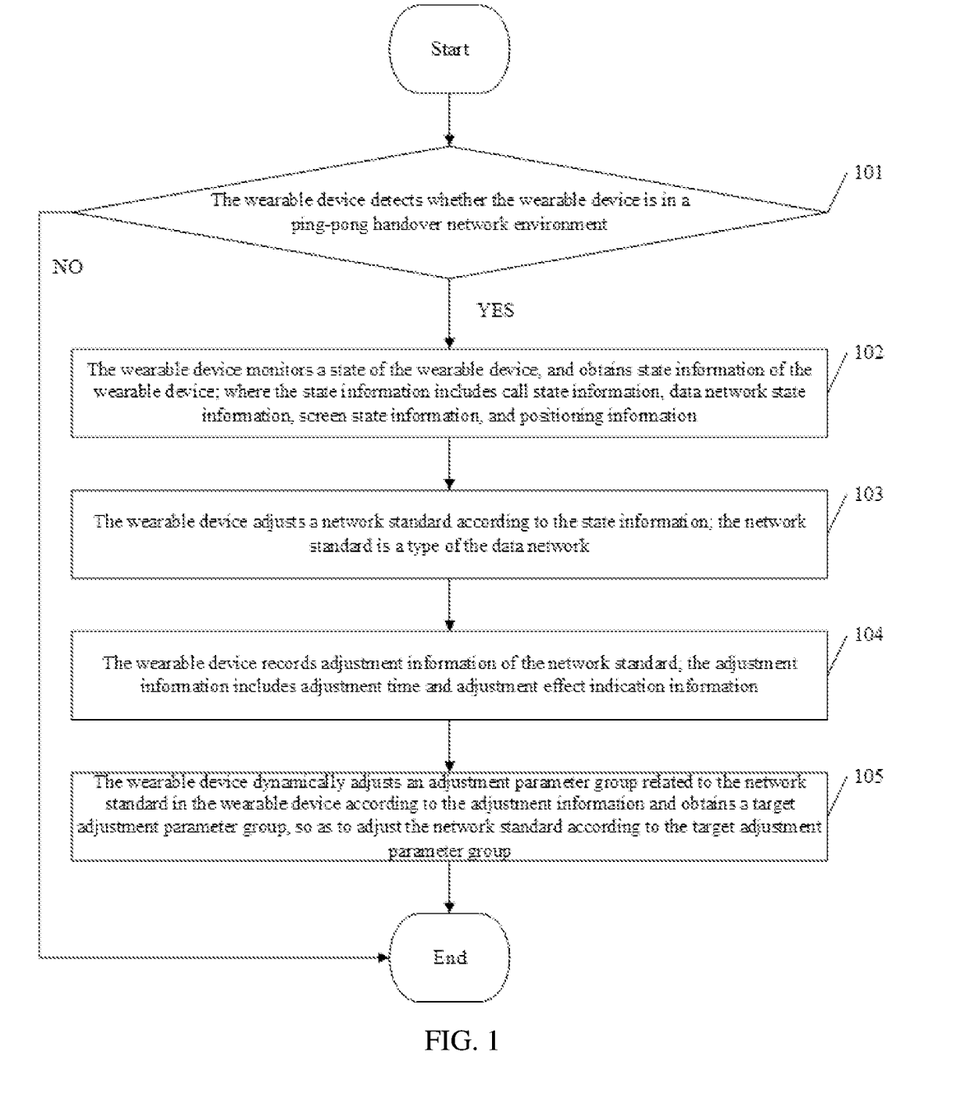
FIG. 1 is a schematic flowchart of a network optimization method based on a wearable device disclosed by an embodiment of the present disclosure.

Please refer to FIG. 1, FIG. 1 is a schematic flowchart of a network optimization method based on a wearable device disclosed by an embodiment of the present disclosure. As shown in FIG. 1, the network optimization method based on a wearable device may include the following steps.

At step 101, the wearable device detects whether the wearable device is in a ping-pong handover network environment; if yes, perform step 102; if not, end this process.

In the embodiments of the present disclosure, the wearable devices may include smart watches, smart bracelets, smart glasses, etc. The ping-pong switching network environment means that in a mobile communication system, if signal strengths of two base stations changes drastically in a certain area, the terminal device will handover back and forth between two base stations and produce the so-called "ping-pong effect". For example, when a user wearing a wearable device is at a boundary of two cells or an overlapping coverage location of a plurality of cells, a ping-pong handover effect will occur between two or more cells, and a power consumption of the wearable device will increase sharply at this time.

As an optional implementation, when the wearable device detects whether the wearable device is in the ping-pong handover network environment, it can detect whether the wearable device is connected to at least two serving cells within a preset time period, and if yes, service durations of the at least two serving cells are obtained to calculate an average service duration of each serving cell. When the average service duration is less than a preset service duration, it is determined that the wearable device is in the ping-pong handover network environment. Implementing this implementation may narrow a detection range, reduce an amount of calculation, quickly determine whether the wearable device is in a ping-pong switching network environment, and improve the detection efficiency.

At step 102, the wearable device monitors a state of the wearable device, and obtains state information of the wearable device; where the state information includes call state information, data network state information, screen state information, and positioning information.

Specifically, the call state information can indicate whether the wearable device has a call and the duration of the call when the call occurs. The data network state information can indicate whether the wearable device has a data service and a serving cell that the wearable device accesses when the data service occurs. The screen state information can indicate whether the wearable device is in a screen-on state and a duration time of the screen-on state. The positioning information can indicate whether the wearable device is moving and a movement distance generated during the movement, where the positioning information can be obtained through a motion sensor in the wearable device, and can also be obtained through a global positioning system (GPS), which is not limited in the embodiments of the present disclosure.

At step 103, the wearable device adjusts a network standard according to the state information; the network standard is a type of the data network.

For example, the network standard used by China Mobile can include GSM (2G), TD-SCDMA (3G) and TD-LTE (4G); the network standard used by China Unicorn can include GSM (2G), WCDMA (3G), TD-LTE (4G) and FDD-LTE (4G); the network standard used by China Telecom can include CDMA1X (2G), EVDO (3G), TD-LTE (4G) and FDD-LTE (4G). For example, assuming that the wearable device accesses to a network of China Mobile, the wearable device can switch between 2G, 3G, and 4G network standards according to the state information, thereby realizing the adjustment of the network standard.

At step 104, the wearable device records adjustment information of the network standard; the adjustment information includes adjustment time and adjustment effect indication information.

In the embodiments of the present disclosure, after each round of adjustment of the network standard, the adjustment information of the network standard is recorded and saved to provide data support for the optimization of the network standard. Where the adjustment time may indicate the time that the wearable device enters the ping-pong handover network environment again after saving the optimization of the network standard, and the adjustment effect indication information may indicate the effect of the wearable device performing each round of network standard optimization.

At step 105, the wearable device dynamically adjusts an adjustment parameter group related to the network standard of the wearable device according to the adjustment information and obtains a target adjustment parameter group, so as to adjust the network standard according to the target adjustment parameter group.

In the embodiments of the present disclosure, the adjustment parameter group related to the network standard can be continuously adjusted dynamically through the adjustment information and the target adjustment parameter group can be obtained, so as to adjust the network standard of the wearable device in the ping-pong handover network environment according to the target adjustment parameter group, where the target adjustment parameter group is applicable to all ping-pong network switching environments. Therefore, when the wearable device encounters the ping-pong network switching network, the user experience can be ensured with a lowest power consumption and without affecting normal functions.

As an optional implementation, a large amount of adjustment information and an adjustment parameter group of each time of adjusting the network standard can be collected, and the adjustment information and the adjustment parameter group can be sent to a background server, so that the background server can train a constructed ping-pong handover network optimization model according to the adjustment information and adjustment parameter group. When a performance parameter value of the ping-pong handover network optimization model is greater than a preset performance parameter value, the ping-pong handover network optimization model is derived from the background server, so that the wearable device can adjust the network standard by using the ping-pong handover network optimization model according to the state information of the device, therefore the adjustment of the network standard may be more accurate and the power consumption may be greatly reduced.

It can be seen that, by implementing the network optimization method based on a wearable device shown in FIG. 1, when it is detected that the wearable device is in a ping-pong switching network environment, the network standard can be adjusted according to monitored device state information, then the adjustment parameter group related to the network standard can be dynamically adjusted according to the adjustment information of the network standard, and the target adjustment parameter group that is most suitable for the device can be obtained, so that when the device enters the ping-pong handover network environment, the target adjustment parameter group is used to adjust the network standard for network optimization, which may reduce power consumption and increase the standby capability of the wearable device.

Embodiment II

Figure 2:
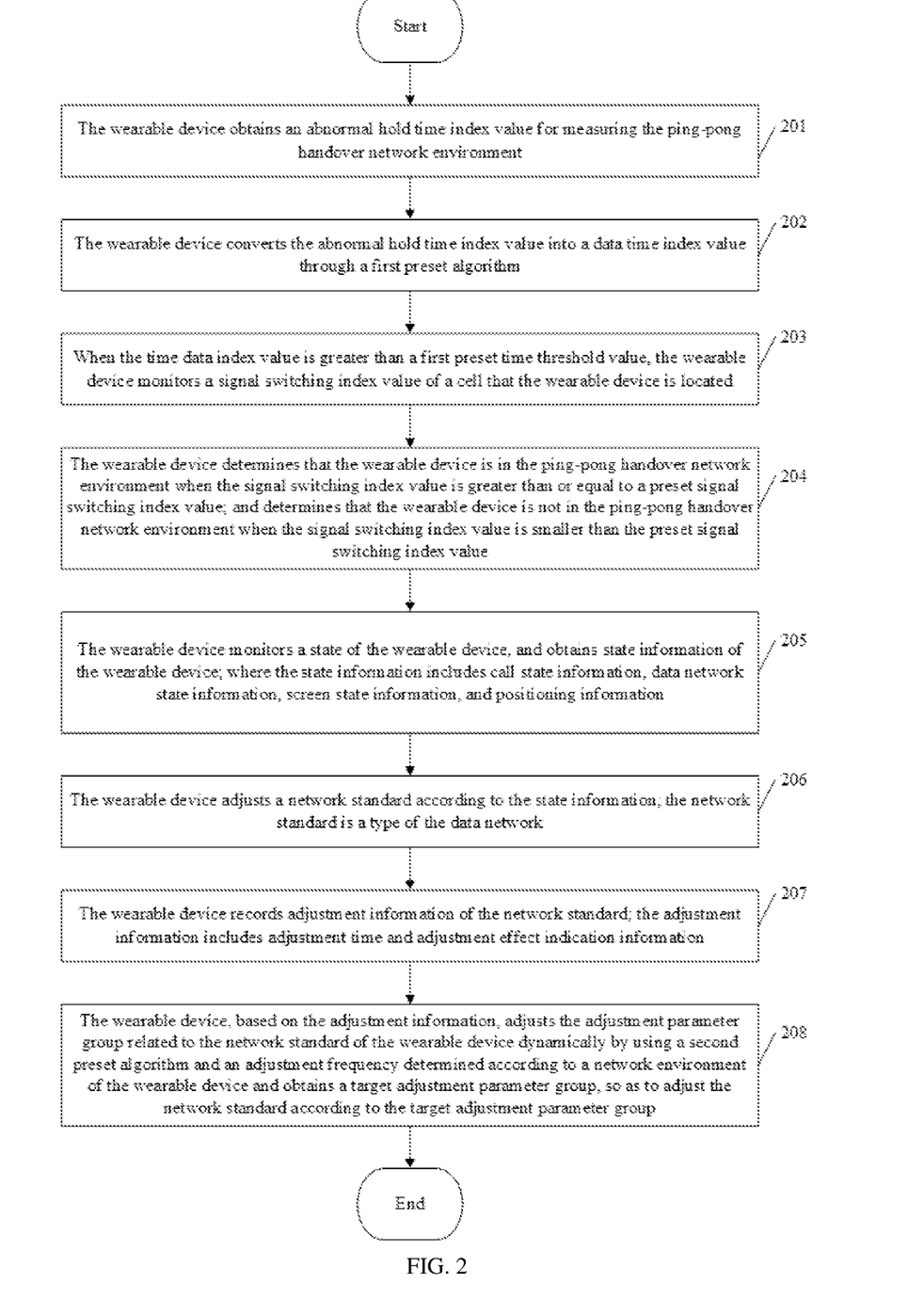
FIG. 2 is a schematic flowchart of another network optimization method based on a wearable device disclosed by an embodiment of the present disclosure.

Please refer to FIG. 2, FIG. 2 is a schematic flowchart of another network optimization method based on a wearable device disclosed by an embodiment of the present disclosure. As shown in FIG. 2, the network optimization method based on a wearable device may include the following steps.

At step 201, the wearable device obtains an abnormal hold time index value for measuring the ping-pong handover network environment.

In the embodiments of the present disclosure, a long-term abnormal hold time index value can be obtained through Radio Resource Control (RRC) to measure the ping-pong handover network environment. A RRC connection process includes selection of an available cell, access admission control of a serving cell and establishment of a signal link.

At step 202, the wearable device converts the abnormal hold time index value into a time data index value through a first preset algorithm.

In the embodiments of the present disclosure, the abnormal hold time index value can be converted into the time data index value through the first preset algorithm. The time data index value is a time index activated in a measurable data channel. Therefore, the time data index value is measurable, the time and reason of the ping-pong handover network can be accurately obtained through the time data index value.

At step 203, when the time data index value is greater than a first preset time threshold value, the wearable device monitors a signal switching index value of a cell that the wearable device is located.

At step 204, the wearable device determines that the wearable device is in the ping-pong handover network environment when the signal switching index value is greater than or equal to a preset signal switching index value; and determines that the wearable device is not in the ping-pong handover network environment when the signal switching index value is smaller than the preset signal switching index value.

In the embodiments of the present disclosure, a signal strength and a cell handover index can be continuously monitored, where the cell handover index includes a cell handover frequency and number of cells. According to the signal strength and the cell handover index, the signal switching index value of the cell that the wearable device is located can be obtained, and then it can be determined whether the wearable device is in the ping-pong switching network environment through the signal switching index value, which may improve the accuracy and detection efficiency of the ping-pong switching network environment detection.

At step 205, the wearable device monitors a state of the wearable device, and obtains state information of the wearable device; where the state information includes call state information, data network state information, screen state information, and positioning information.

At step 206, the wearable device adjusts a network standard according to the state information; the network standard is a type of the data network.

At step 207, the wearable device records adjustment information of the network standard; the adjustment information includes adjustment time and adjustment effect indication information.

At step 208, the wearable device, based on the adjustment information, adjusts the adjustment parameter group related to the network standard of the wearable device dynamically by using a second preset algorithm and an adjustment frequency determined according to a network environment of the wearable device and obtains a target adjustment parameter group, so as to adjust the network standard according to the target adjustment parameter group.

In the embodiments of the present disclosure, a frequency of dynamically adjusting the adjustment parameter group related to the network standard may be based on the network environment of the wearable device. For example, when the wearable device is in a ping-pong handover network environment of two cells, the frequency for dynamically adjusting can be once every 10 minutes, and when the wearable device is in a ping-pong handover network environment of three cells, the frequency for dynamically adjusting can be once every 5 minutes. Therefore, dynamically adjusting the adjustment parameter group related to the network standard by using the second preset algorithm according to the adjustment frequency determined according to the network environment of the wearable device may make the obtained target adjustment parameter group more suitable for adjustment and optimization of a multi-party ping-pong handover and improve the accuracy of the ping-pong handover network adjustment.

It can be seen that, by implementing the network optimization method based on a wearable device shown in FIG. 2, when it is detected that the wearable device is in a ping-pong switching network environment, the network standard can be adjusted according to monitored device state information, then the adjustment parameter group related to the network standard is dynamically adjusted according to the adjustment information of the network standard, and the target adjustment parameter group that is most suitable for the device can be obtained, so that when the device enters the ping-pong handover network environment, the target adjustment parameter group is used to adjust the network standard for network optimization, which may reduce power consumption and increase the standby capability of the wearable device. In addition, it can be determined whether the wearable device is in the ping-pong handover network environment through the signal switching index value, which may improve the accuracy and detection efficiency of the ping-pong handover network environment detection.

Embodiment III

Figure 3:
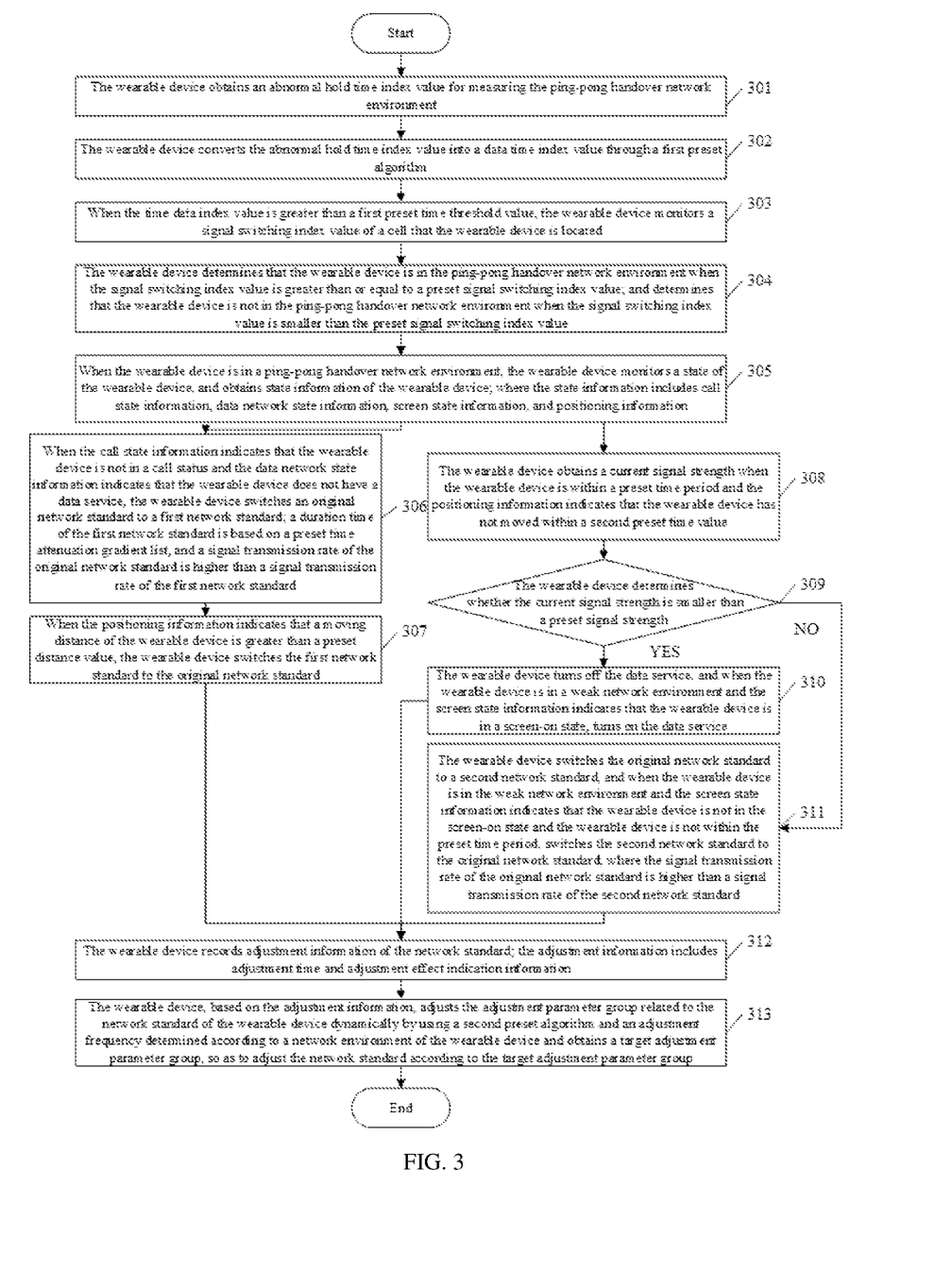
FIG. 3 is a schematic flowchart of another network optimization method based on a wearable device disclosed by an embodiment of the present disclosure.

Please refer to FIG. 3, FIG. 3 is a schematic flowchart of another network optimization method based on a wearable device disclosed by an embodiment of the present disclosure. As shown in FIG. 3, the network optimization method based on a wearable device may include the following steps.

At step 301, the wearable device obtains an abnormal hold time index value for measuring the ping-pong handover network environment.

At step 302, the wearable device converts the abnormal hold time index value into a time data index value through a first preset algorithm.

At step 303, when the time data index value is greater than a first preset time threshold value, the wearable device monitors a signal switching index value of a cell that the wearable device is located.

At step 304, the wearable device determines that the wearable device is in the ping-pong handover network environment when the signal switching index value is greater than or equal to a preset signal switching index value; and determines that the wearable device is not in the ping-pong handover network environment when the signal switching index value is smaller than the preset signal switching index value.

At step 305, when the wearable device is in a ping-pong handover network environment, the wearable device monitors a state of the wearable device, and obtains state information of the wearable device; where the state information includes call state information, data network state information, screen state information, and positioning information.

At step 306, when the call state information indicates that the wearable device is not in a call status and the data network state information indicates that the wearable device does not have a data service, the wearable device switches an original network standard to a first network standard; a duration time of the first network standard is based on a preset time attenuation gradient list, and a signal transmission rate of the original network standard is higher than a signal transmission rate of the first network standard.

In the embodiments of the present disclosure, when the wearable device is in a ping-pong switching network environment and no call or data service occurs, the network standard is reduced, and a duration time of the reduced network standard is based on a preset time attenuation gradient list, for example, the preset time attenuation gradient list Q1: 10 minutes, 20 minutes, 30 minutes, 40 minutes . . . , where Q1-1 is 10 minutes, and Q1-2 is 20 minutes. The first time no call or data service occurs, the network standard is reduced and the duration time is 10 minutes. When the second time no call or data service occurs, the network standard is reduced and the duration time is 20 minutes.

At step 307, when the positioning information indicates that a moving distance of the wearable device is greater than a preset distance value, the wearable device switches the first network standard to the original network standard and skips to step 312.

Specifically, when the wearable device moves a certain distance, the network standard is restored to restore a normal data signal of the wearable device, so as to ensure the user experience without affecting normal functions.

As an optional implementation, a location range where the ping-pong handover network is located and real-time location information of the wearable device are obtained. When the real-time location information of the wearable device is within the location range of the ping-pong handover network, if no call and data service occurs, the network standard is reduced; when the real-time location information indicates that the wearable device moves outside the location range of the ping-pong handover network, the network standard is restored. By implementing this implementation, the network standard may be adjusted more accurately based on the real-time location information, and real-time optimization of the network may be realized.

At step 308, the wearable device obtains a current signal strength when the wearable device is within a preset time period and the positioning information indicates that the wearable device has not moved within a second preset time value.

In the embodiments of the present disclosure, when the wearable device is in a static state at night (where the static state can be achieved by monitoring state information of various sensors), the signal strength at this time is monitored to obtain the current signal strength.

At step 309, the wearable device determines whether the current signal strength is smaller than a preset signal strength; if yes, step 310 is performed; if not, step 311 is performed.

At step 310, the wearable device turns off the data service, and when the wearable device is in a weak network environment and the screen state information indicates that the wearable device is in a screen-on state, turns on the data service.

At step 311, the wearable device switches the original network standard to a second network standard, and when the wearable device is in the weak network environment and the screen state information indicates that the wearable device is not in the screen-on state and the wearable device is not within the preset time period, switches the second network standard to the original network standard; where the signal transmission rate of the original network standard is higher than a signal transmission rate of the second network standard.

Specifically, when the current signal strength is greater than or equal to the preset signal strength, the network standard is reduced, and then when the wearable device is in the weak network environment and the screen is in a black-screen state, after a night mode ends, the network standard is restored to ensure operation of normal functions.

At step 312, the wearable device records adjustment information of the network standard; the adjustment information includes adjustment time and adjustment effect indication information.

At step 313, the wearable device, based on the adjustment information, adjusts the adjustment parameter group related to the network standard of the wearable device dynamically by using a second preset algorithm and an adjustment frequency determined according to a network environment of the wearable device and obtains a target adjustment parameter group, so as to adjust the network standard according to the target adjustment parameter group.

It can be seen that, by implementing the network optimization method based on a wearable device shown in FIG. 3, when it is detected that the wearable device is in a ping-pong switching network environment, the network standard can be adjusted according to monitored device state information, then the adjustment parameter group related to the network standard is dynamically adjusted according to the adjustment information of the network standard, and the target adjustment parameter group that is most suitable for the device can be obtained, so that when the device enters the ping-pong handover network environment, the target adjustment parameter group is used to adjust the network standard for network optimization, which may reduce power consumption and increase the standby capability of the wearable device. In addition, it can be determined whether the wearable device is in a ping-pong handover network environment through the signal switching index value, which may improve the accuracy and detection efficiency of the ping-pong handover network environment detection, and may also meet adjustment and optimization of a multi-party ping-pong handover and improve the accuracy of the ping-pong handover network adjustment.

Embodiment IV

Figure 4:
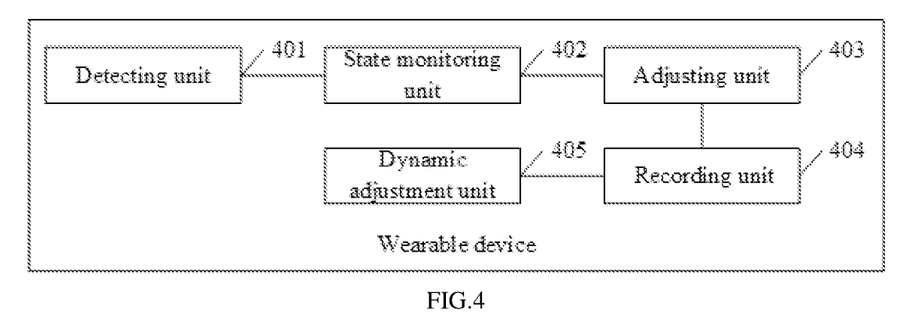
FIG. 4 is a schematic structural diagram of a wearable device disclosed by an embodiment of the present disclosure.

Please refer to FIG. 4, FIG. 4 is a schematic structural diagram of a wearable device disclosed by an embodiment of the present disclosure. As shown in FIG. 4, the wearable device may include a detecting unit 401, configured to detect whether the wearable device is in a ping-pong handover network environment.

In the embodiments of the present disclosure, the wearable devices may include smart watches, smart bracelets, smart glasses, etc. The ping-pong switching network environment means that in a mobile communication system, if signal strengths of two base stations changes drastically in a certain area, the terminal device will handover back and forth between two base stations and produce the so-called "ping-pong effect". For example, when a user wearing a wearable device is at a boundary of two cells or an overlapping coverage location of a plurality of cells, a ping-pong handover effect will occur between two or more cells, and a power consumption of the wearable device will increase sharply at this time.

As an optional implementation, the detecting unit 401 is configured to detect whether the wearable device is connected to at least two serving cells within a preset time period while detecting whether the wearable device is in the ping-pong handover network environment, and if yes, service durations of the at least two serving cells are obtained to calculate an average service duration of each serving cell. When the average service duration is less than a preset service duration, it is determined that the wearable device is in the ping-pong handover network environment. Implementing this implementation may narrow a detection range, reduce an amount of calculation, quickly determine whether the wearable device is in a ping-pong switching network environment, and improve the detection efficiency.

The wearable device may further include a state monitoring unit 402, configured to monitor a state of the wearable device, and obtain state information of the wearable device when the detecting unit detects that the wearable device is in the ping-pong handover network environment; where the state information includes call state information, data network state information, screen state information, and positioning information.

Specifically, the call state information can indicate whether the wearable device has a call and the duration of the call when the call occurs. The data network state information can indicate whether the wearable device has a data service and a serving cell that the wearable device accesses when the data service occurs. The screen state information can indicate whether the wearable device is in a screen-on state and duration time of the screen-on state. The positioning information can indicate whether the wearable device is moving and a movement distance generated during the movement, where the positioning information can be obtained through a motion sensor in the wearable device, and can also be obtained through a global positioning system (GPS), which is not limited in the embodiments of the present disclosure.

The wearable device may further include an adjusting unit 403, configured to adjust a network standard according to the state information; the network standard is a type of the data network.

For example, the network standard used by China Mobile can include GSM (2G), TD-SCDMA (3G) and TD-LTE (4G); the network standard used by China Unicom can include GSM (2G), WCDMA (3G), TD-LTE (4G) and FDD-LTE (4G); the network standard used by China Telecom can include CDMA1X (2G), EVDO (3G), TD-LTE (4G) and FDD-LTE (4G). For example, assuming that the wearable device accesses to a network of China Mobile, the wearable device can switch between 2G, 3G, and 4G network standards according to the state information, thereby realizing the adjustment of the network standard.

The wearable device may further include a recording unit 404, configured to record adjustment information of the network standard; the adjustment information includes adjustment time and adjustment effect indication information.

In the embodiments of the present disclosure, the recording unit 404 is configured to, after each round of adjustment of the network standard, record and save the adjustment information of the network standard to provide data support for the optimization of the network standard. Where the adjustment time may indicate the time that the wearable device enters the ping-pong handover network environment again after saving the optimization of the network standard, and the adjustment effect indication information may indicate the effect of the wearable device performing each round of network standard optimization.

The wearable device may further include a dynamic adjustment unit 405, configured to dynamically adjust an adjustment parameter group related to the network standard of the wearable device according to the adjustment information and obtain a target adjustment parameter group, so as to adjust the network standard according to the target adjustment parameter group.

In the embodiments of the present disclosure, the dynamic adjustment unit 405 is configured to dynamically adjust the adjustment parameter group related to the network standard continuously through the adjustment information and obtain the target adjustment parameter group, so as to adjust the network standard of the wearable device in the ping-pong handover network environment according to the target adjustment parameter group, where the target adjustment parameter group is applicable to all ping-pong network switching environments. Therefore, when the wearable device encounters the ping-pong network switching network, the user experience may be ensured with a lowest power consumption and without affecting normal functions.

As an optional implementation, a large amount of adjustment information and an adjustment parameter group of each time of adjusting the network standard can be collected, and the adjustment information and the adjustment parameter group can be sent to a background server, so that the background server can train a constructed ping-pong handover network optimization model according to the adjustment information and adjustment parameter group. When a performance parameter value of the ping-pong handover network optimization model is greater than a preset performance parameter value, the ping-pong handover network optimization model is derived from the background server, so that the wearable device can adjust the network standard by using the ping-pong handover network optimization model according to the state information of the device, therefore the adjustment of the network standard may be more accurate and the power consumption may be greatly reduced.

It can be seen that, by implementing the wearable device shown in FIG. 4, when it is detected that the wearable device is in a ping-pong switching network environment, the network standard can be adjusted according to monitored device state information, then the adjustment parameter group related to the network standard is dynamically adjusted according to the adjustment information of the network standard, and the target adjustment parameter group that is most suitable for the device can be obtained, so that when the device enters the ping-pong handover network environment, the target adjustment parameter group is used to adjust the network standard for network optimization, which may reduce power consumption and increase the standby capability of the wearable device.

Embodiment V

Figure 5:
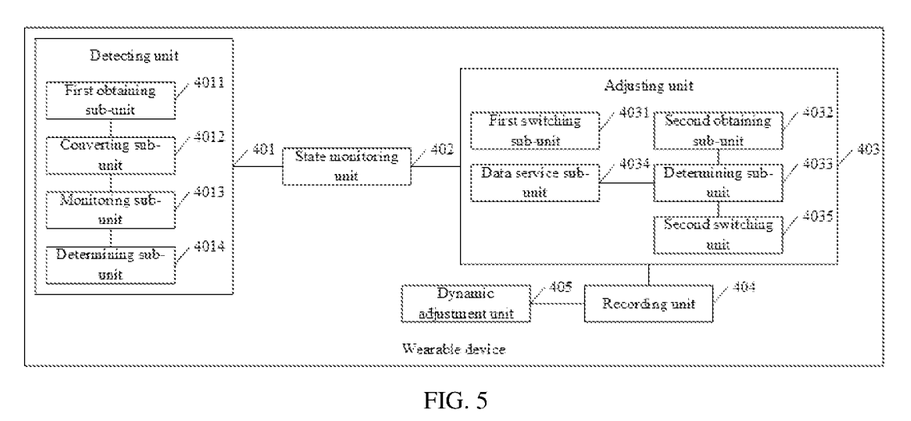
FIG. 5 is a schematic structural diagram of another wearable device disclosed by an embodiment of the present disclosure.

Please refer to FIG. 5, FIG. 5 is a schematic structural diagram of another wearable device disclosed by an embodiment of the present disclosure. As shown in FIG. 5, the wearable device shown in FIG. 5 is obtained by optimizing the wearable device shown in FIG. 4. Compared with the wearable device shown in FIG. 4, the wearable device shown in FIG. 5 may further include:

As an optional implementation, the above-mentioned detecting unit 401 further includes a first obtaining subunit 4011, configured to obtain an abnormal hold time index value for measuring the ping-pong handover network environment.

In the embodiments of the present disclosure, the first obtaining subunit 4011 is configured to obtain a long-term abnormal hold time index value through Radio Resource Control (RRC) to measure the ping-pong handover network environment. A RRC connection process includes selection of an available cell, access admission control of a serving cell and establishment of a signal link.

The above-mentioned detecting unit 401 further includes a converting subunit 4012, configured to convert the abnormal hold time index value into a time data index value through a first preset algorithm.

In the embodiments of the present disclosure, the converting subunit 4012 is configured to convert the abnormal hold time index value into the time data index value through the first preset algorithm. The time data index value is a time index activated in a measurable data channel. Therefore, the time data index value is measurable, the time and reason of the ping-pong handover network can be accurately obtained through the time data index value.

The above-mentioned detecting unit 401 further includes a monitoring subunit 4013, configured to monitor a signal switching index value of a cell that the wearable device is located when the time data index value is greater than a first preset time threshold value; and a determining subunit 4014, configured to determine that the wearable device is in the ping-pong handover network environment when the signal switching index value is greater than or equal to a preset signal switching index value; and determine that the wearable device is not in the ping-pong handover network environment when the signal switching index value is smaller than the preset signal switching index value.

In the embodiments of the present disclosure, the monitoring subunit 4013 is configured to continuously monitor a signal strength and a cell handover index, where the cell handover index includes a cell handover frequency and number of cells, and obtain the signal switching index value of the cell that the wearable device is located according to the signal strength and the cell handover index. The determining subunit 4014 is configured to determine whether the wearable device is in the ping-pong switching network environment through the signal switching index value, which may improve the accuracy and detection efficiency of the ping-pong switching network environment detection.

As an optional implementation, the above-mentioned adjusting unit 403 includes a first switching subunit 4031, configured to switch an original network standard to a first network standard when the call state information indicates that the wearable device is not in a call status and the data network state information indicates that the wearable device does not have a data service; where a duration time of the first network standard is based on a preset time attenuation gradient list, and a signal transmission rate of the original network standard is higher than a signal transmission rate of the first network standard; and switch the first network standard to the original network standard when the positioning information indicates that a moving distance of the wearable device is greater than a preset distance value.

In the embodiments of the present disclosure, the first switching subunit 4031 is configured to reduce the network standard when the wearable device is in the ping-pong switching network environment and no call or data service occurs, and a duration time of the reduced network standard is based on a preset time attenuation gradient list, for example, the preset time attenuation gradient list Q1: 10 minutes, 20 minutes, 30 minutes, 40 minutes . . . , where Q1-1 is 10 minutes, and Q1-2 is 20 minutes. The first time no call or data service occurs, the network standard is reduced and the duration time is 10 minutes. When the second time no call or data service occurs, the network standard is reduced and the duration time is 20 minutes.

Specifically, when the wearable device moves a certain distance, the network standard is restored to restore a normal data signal of the wearable device, so as to ensure the user experience without affecting normal functions.

As an optional implementation, the first switching subunit 4031 is configured to obtain a location range where the ping-pong handover network is located and real-time location information of the wearable device, and when the real-time location information of the wearable device is within the location range of the ping-pong handover network, if no call and data service occurs, reduce the network standard; when the real-time location information indicates that the wearable device moves outside the location range of the ping-pong handover network, restore the network standard. By implementing this implementation, the network standard may be adjusted more accurately based on the real-time location information, and real-time optimization of the network may be realized.

As an optional implementation, the above-mentioned adjusting unit 403 further includes a second obtaining subunit 4032, configured to obtain a current signal strength when the wearable device is within a preset time period and the positioning information indicates that the wearable device has not moved within a second preset time value.

In the embodiments of the present disclosure, the second obtaining subunit 4032 is configured to, when the wearable device is in a static state at night (where the static state can be achieved by monitoring state information of various sensors), monitor the signal strength at this time and obtain the current signal strength.

The above-mentioned adjusting unit 403 further includes: a determining subunit 4033, configured to determine whether the current signal strength is smaller than a preset signal strength; a data service subunit 4034, configured to turn off the data service when the determining subunit determines that the current signal strength is smaller than the preset signal strength, and turn on the data service when the wearable device is in a weak network environment and the screen state information indicates that the wearable device is in a screen-on state; and a second switching unit 4035, configured to switch the original network standard to a second network standard when the determining subunit determines that the current signal strength is greater than or equal to the preset signal strength, and switch the second network standard to the original network standard when the wearable device is in the weak network environment and the screen state information indicates that the wearable device is not in the screen-on state and the wearable device is not within the preset time period; where the signal transmission rate of the original network standard is higher than a signal transmission rate of the second network standard.

Specifically, the second switching unit 4035 is configured to, when the current signal strength is greater than or equal to the preset signal strength, reduce the network standard, and then when the wearable device is in the weak network environment and the screen is in a black-screen state, after a night mode ends, restore the network standard to ensure operation of normal functions.

The above-mentioned dynamic adjustment unit 405 is configured to dynamically adjust an adjustment parameter group related to the network standard of the wearable device according to the adjustment information and obtain a target adjustment parameter group, so as to adjust the network standard according to the target adjustment parameter group.

Specifically, the dynamic adjustment unit 405 is configured to, based on the adjustment information, dynamically adjust the adjustment parameter group related to the network standard of the wearable device by using a second preset algorithm and an adjustment frequency determined according to a network environment of the wearable device and obtain the target adjustment parameter group, so as to adjust the network standard according to the target adjustment parameter group.

In the embodiments of the present disclosure, a frequency of dynamically adjusting the adjustment parameter group related to the network standard may be based on the network environment that the wearable device is located. For example, when the wearable device is in a ping-pong handover network environment of two cells, the frequency for dynamically adjusting can be once every 10 minutes, and when the wearable device is in a ping-pong handover network environment of three cells, the frequency for dynamically adjusting can be once every 5 minutes. Therefore, dynamically adjusting the adjustment parameter group related to the network standard by using the second preset algorithm according to the adjustment frequency determined according to the network environment of the wearable device may make the obtained target adjustment parameter group more suitable for adjustment and optimization of a multi-party ping-pong handover and improve the accuracy of the ping-pong handover network adjustment.

It can be seen that, by implementing the wearable device shown in FIG. 5, when it is detected that the wearable device is in a ping-pong switching network environment, the network standard can be adjusted according to monitored device state information, then the adjustment parameter group related to the network standard is dynamically adjusted according to the adjustment information of the network standard, and the target adjustment parameter group that is most suitable for the device can be obtained, so that when the device enters the ping-pong handover network environment, the target adjustment parameter group is used to adjust the network standard for network optimization, which may reduce power consumption and increase the standby capability of the wearable device. In addition, it can be determined whether the wearable device is in a ping-pong handover network environment through the signal switching index value, which may improve the accuracy and detection efficiency of the ping-pong handover network environment detection, and may also meet adjustment and optimization of a multi-party ping-pong handover and improve the accuracy of the ping-pong handover network adjustment.

Embodiment VI

Figure 6:
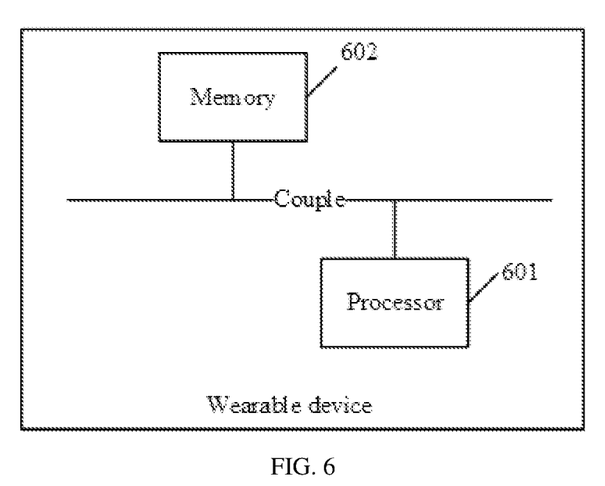
FIG. 6 is a schematic structural diagram of another wearable device disclosed by an embodiment of the present disclosure.

Please refer to FIG. 6, FIG. 6 is a schematic structural diagram of another wearable device disclosed by an embodiment of the present disclosure. As shown in FIG. 6, the wearable device may include: a memory 601 having executable program codes stored therein; a processor 602 coupled to the memory 601; where the processor 602 invokes the executable program codes stored in the memory 601 to perform any network optimization method based on a wearable device shown in FIGS. 1 to 3.

The embodiments of the present disclosure disclose a computer readable storage medium storing a computer program, where the computer program causes a computer to execute any network optimization method based on a wearable device shown in FIGS. 1 to 3.

The embodiments of the present disclosure further disclose a computer program product, when the computer program product runs on a computer, the computer is enabled to perform some or all of the steps of the method according to any one of the above-mentioned method embodiments.

Persons of ordinary skill in the art may understand that, all or a part of the steps in each method of the foregoing embodiments may be implemented by a program instructing related hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory (EE-PROM), a compact disc read-only memory (CD-ROM) or another optical disc memory, magnetic disk memory, and magnetic tape memory, or any other computer readable medium that can be configured to carry or store data.

The network optimization method based on a wearable device and the wearable device disclosed in the embodiments of the present disclosure are described above in detail. The principle and implementations herein are described through specific examples. The description about the embodiments is merely provided to help understand the method and core ideas of the present disclosure. In addition, persons of ordinary skill in the art can make modifications to the present disclosure in terms of the specific implementations and application scopes based on the ideas of the present disclosure. To sum up, the content of specification shall not be construed as a limit to the present disclosure.

What is claimed is:

1. A network optimization method based on a wearable device, comprising:
   detecting whether the wearable device is in a ping-pong handover network environment;
   if the wearable device is in a ping-pong handover network environment, monitoring a state of the wearable device, and obtaining state information of the wearable device, wherein the state information comprises call state information, data network state information, screen state information, and positioning information;
   adjusting a network standard according to the state information, wherein the network standard is a type of the data network;
   recording adjustment information of the network standard, wherein the adjustment information comprises adjustment time and adjustment effect indication information; and
   adjusting an adjustment parameter group related to the network standard of the wearable device dynamically according to the adjustment information and obtaining a target adjustment parameter group, so as to adjust the network standard according to the target adjustment parameter group;
   wherein the adjusting an adjustment parameter group related to the network standard of the wearable device dynamically according to the adjustment information and obtaining a target adjustment parameter group, so as to adjust the network standard according to the target adjustment parameter group comprises:
   based on the adjustment information, adjusting the adjustment parameter group related to the network standard of the wearable device dynamically by using a second preset algorithm and an adjustment frequency determined according to a network environment of the wearable device and obtaining a target adjustment parameter group, so as to adjust the network standard according to the target adjustment parameter group;
   wherein the adjusting a network standard according to the state information comprises:
   when the call state information indicates that the wearable device is not in a call status and the data network state information indicates that the wearable device does not have a data service, switching an initial network standard to a first network standard, wherein a duration time of the first network standard is based on a preset time attenuation gradient list, and a signal transmission rate of the initial network standard is higher than a signal transmission rate of the first network standard;
   when the positioning information indicates that a moving distance of the wearable device is greater than a preset distance value, switching the first network standard to the initial network standard.

2. The method according to claim 1, further comprising:
   obtaining a current signal strength when the wearable device is within a preset time period and the positioning information indicates that the wearable device has not moved within a second preset time threshold value; and
   determining whether the current signal strength is smaller than a preset signal strength;
   if the current signal strength is smaller than a preset signal strength, turning off the data service, and when the wearable device is in a poor network environment and the screen state information indicates that the wearable device is in a screen-on state, turning on the data service;
if the current signal strength is not smaller than a preset signal strength, switching the initial network standard to a second network standard, and when the wearable device is in the poor network environment and the screen state information indicates that the wearable device is not in the screen-on state and the wearable device is not within the preset time period, switching the second network standard to the initial network standard, wherein the signal transmission rate of the initial network standard is higher than a signal transmission rate of the second network standard.

3. The method according to claim 1, wherein after the initial network standard is switched to the first network standard, when real-time location information indicates that the wearable device moves outside the location range of a ping-pong handover network, the network standard is restored to the initial network standard.

4. A wearable device, comprising:
a memory having executable program codes stored therein; and
a processor coupled to the memory;
wherein the processor invokes the executable program codes stored in the memory to perform the following steps:
detecting whether the wearable device is in a ping-pong handover network environment;
if the wearable device is in a ping-pong handover network environment, monitoring a state of the wearable device, and obtaining state information of the wearable device, wherein the state information comprises call state information, data network state information, screen state information, and positioning information;
adjusting a network standard according to the state information, wherein the network standard is a type of the data network;
recording adjustment information of the network standard, wherein the adjustment information comprises adjustment time and adjustment effect indication information; and
adjusting an adjustment parameter group related to the network standard of the wearable device dynamically according to the adjustment information and obtaining a target adjustment parameter group, so as to adjust the network standard according to the target adjustment parameter group;
wherein the adjusting an adjustment parameter group related to the network standard of the wearable device dynamically according to the adjustment information and obtaining a target adjustment parameter group, so as to adjust the network standard according to the target adjustment parameter group comprises:
based on the adjustment information, adjusting the adjustment parameter group related to the network standard of the wearable device dynamically by using a second preset algorithm and an adjustment frequency determined according to a network environment of the wearable device and obtaining a target adjustment parameter group, so as to adjust the network standard according to the target adjustment parameter group;
wherein the adjusting a network standard according to the state information comprises:
when the call state information indicates that the wearable device is not in a call status and the data network state information indicates that the wearable device does not have a data service, switching an initial network standard to a first network standard, wherein a duration time of the first network standard is based on a preset time attenuation gradient list, and a signal transmission rate of the initial network standard is higher than a signal transmission rate of the first network standard;
when the positioning information indicates that a moving distance of the wearable device is greater than a preset distance value, switching the first network standard to the initial network standard.

5. The wearable device according to claim 4, wherein the processor further invokes the executable program codes stored in the memory to perform the following steps:
obtaining a current signal strength when the wearable device is within a preset time period and the positioning information indicates that the wearable device has not moved within a second preset time threshold value; and
determining whether the current signal strength is smaller than a preset signal strength;
if the current signal strength is smaller than a preset signal strength, turning off the data service, and when the wearable device is in a poor network environment and the screen state information indicates that the wearable device is in a screen-on state, turning on the data service;
if the current signal strength is not smaller than a preset signal strength, switching the initial network standard to a second network standard, and when the wearable device is in the poor network environment and the screen state information indicates that the wearable device is not in the screen-on state and the wearable device is not within the preset time period, switching the second network standard to the initial network standard, wherein the signal transmission rate of the initial network standard is higher than a signal transmission rate of the second network standard.

6. The wearable device according to claim 4, wherein after the initial network standard is switched to the first network standard, when real-time location information indicates that the wearable device moves outside the location range of a ping-pong handover network, the network standard is restored to the initial network standard.

7. A non-transitory computer readable storage medium, wherein the non-transitory computer readable storage medium stores a computer program, and the computer program causes a computer to:
detect whether a wearable device is in a ping-pong handover network environment;
monitor a state of the wearable device, and obtain state information of the wearable device if the wearable device is in a ping-pong handover network environment, wherein the state information comprises call state information, data network state information, screen state information, and positioning information;
adjust a network standard according to the state information, wherein the network standard is a type of the data network;
record adjustment information of the network standard, wherein the adjustment information comprises adjustment time and adjustment effect indication information; and
adjust an adjustment parameter group related to the network standard of the wearable device dynamically according to the adjustment information and obtain a target adjustment parameter group, so as to adjust the network standard according to the target adjustment parameter group;

wherein said adjust an adjustment parameter group related to the network standard of the wearable device dynamically according to the adjustment information and obtain a target adjustment parameter group, so as to adjust the network standard according to the target adjustment parameter group comprises:

based on the adjustment information, adjusting the adjustment parameter group related to the network standard of the wearable device dynamically by using a second preset algorithm and an adjustment frequency determined according to a network environment of the wearable device and obtaining a target adjustment parameter group, so as to adjust the network standard according to the target adjustment parameter group;

wherein said adjust a network standard according to the state information comprises:

switch an initial network standard to a first network standard when the call state information indicates that the wearable device is not in a call status and the data network state information indicates that the wearable device does not have a data service, wherein a duration time of the first network standard is based on a preset time attenuation gradient list, and a signal transmission rate of the initial network standard is higher than a signal transmission rate of the first network standard; and switch the first network standard to the initial network standard when the positioning information indicates that a moving distance of the wearable device is greater than a preset distance value.

8. The non-transitory computer readable storage medium according to claim 7, wherein the computer program further causes the computer to:

obtain a current signal strength when the wearable device is within a preset time period and the positioning information indicates that the wearable device has not moved within a second preset time threshold value; and determine whether the current signal strength is smaller than a preset signal strength;

turn off the data service if the current signal strength is smaller than the preset signal strength, and turn on the data service when the wearable device is in a poor network environment and the screen state information indicates that the wearable device is in a screen-on state;

switch the initial network standard to a second network standard if the current signal strength is not smaller than a preset signal strength, and switch the second network standard to the initial network standard when the wearable device is in the poor network environment and the screen state information indicates that the wearable device is not in the screen-on state and the wearable device is not within the preset time period, wherein the signal transmission rate of the initial network standard is higher than a signal transmission rate of the second network standard.

9. The non-transitory computer readable storage medium according to claim 7, wherein after the initial network standard is switched to the first network standard, when real-time location information indicates that the wearable device moves outside the location range of a ping-pong handover network, the network standard is restored to the initial network standard.

* * * * *